United States Patent [19]
Tran

[11] Patent Number: 5,898,849
[45] Date of Patent: Apr. 27, 1999

[54] MICROPROCESSOR EMPLOYING LOCAL CACHES FOR FUNCTIONAL UNITS TO STORE MEMORY OPERANDS USED BY THE FUNCTIONAL UNITS

[75] Inventor: Thang M. Tran, Austin, Tex.

[73] Assignee: Advanced Micro Devices, Inc., Sunnyvale, Calif.

[21] Appl. No.: 08/835,066

[22] Filed: Apr. 4, 1997

[51] Int. Cl.⁶ .............................. G06F 9/06; G06F 12/00
[52] U.S. Cl. ...................... 395/379; 711/121; 395/800.32
[58] Field of Search .................................. 711/119, 121, 711/138; 395/392, 393, 395, 379, 800.32

[56] References Cited

U.S. PATENT DOCUMENTS

| | | | |
|---|---|---|---|
| 5,222,224 | 6/1993 | Flynn et al. ............................. | 711/114 |
| 5,317,716 | 5/1994 | Liu ......................................... | 711/144 |
| 5,327,570 | 7/1994 | Foster et al. .......................... | 395/800.3 |
| 5,510,934 | 4/1996 | Brennan et al. ....................... | 711/119 |
| 5,551,001 | 8/1996 | Cohen et al. . | |
| 5,592,679 | 1/1997 | Yung ...................................... | 395/800 |
| 5,644,752 | 7/1997 | Cohen et al. . | |
| 5,768,555 | 6/1998 | Tran et al. ............................. | 395/392 |
| 5,784,588 | 7/1998 | Leung .................................... | 395/392 |
| 5,802,338 | 9/1998 | Rechtschaffen et al. .............. | 395/393 |

OTHER PUBLICATIONS

U.S. application No. 08/884,435, Witt, filed Jun. 1997.
U.S. application No. 09/078,226, Witt, filed May 1998.

*Primary Examiner*—Krisna Lim
*Attorney, Agent, or Firm*—Conley, Rose & Tayon; Lawrence J. Merkel; B. Noel Kivlin

[57] ABSTRACT

A microprocessor employs a local cache for each functional unit, located physically close to that functional unit. The local caches are relatively small as compared to a central cache optionally included in the microprocessor as well. Because the local caches are small, internal interconnection delays within the local caches may be less than those experienced by the central cache. Additionally, the physical proximity of the local cache to the functional unit which accesses the local cache reduces the interconnect delay between the local cache and the functional unit. If the memory operand hits in a remote cache (either a different local cache or the central cache), the cache line containing the memory operand is transferred to the local cache experiencing the miss. According to one embodiment including multiple symmetrical functional units, the local caches coupled to the symmetrical functional units are restricted to storing different cache lines from each other. For example, a number of bits of the tag address may be used to select which of the local caches is to store the corresponding cache line. A data prediction scheme for predicting the functional unit to which a given instruction should be dispatched may be implemented, wherein the prediction is formed based upon the cache line storing the memory operand during a previous execution of the given instruction.

28 Claims, 7 Drawing Sheets

MICROPROCESSOR EMPLOYING LOCAL CACHES FOR FUNCTIONAL UNITS TO STORE MEMORY OPERANDS USED BY THE FUNCTIONAL UNITS

BACKGROUND OF THE INVENTION

1. Field of the Invention

This invention is related to the field of microprocessors and, more particularly, to caching mechanisms within microprocessors

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessors demand high memory bandwidth due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to allow high bandwidth memory access (thereby increasing the instruction execution efficiency and ultimately microprocessor performance), microprocessors typically employ one or more caches to store the most recently accessed data and instructions. A relatively small number of clock cycles may be required to access data stored in a cache, as opposed to a relatively larger number of clock cycles are required to access the main memory.

Unfortunately, the number of clock cycles required for cache access is increasing in modern microprocessors. Where previously a cache latency (i.e. the time from initiating an access to the corresponding data becoming available for execution) might have been as low as one clock cycle, cache latencies in modern microprocessors may be two or even three clock cycles. A variety of delay sources are responsible for the increased cache latency. As transistor geometries characteristic of modern semiconductor fabrication technologies have decreased, interconnect delay has begun to dominate the delay experienced by circuitry upon on integrated circuit such as a microprocessor. Such interconnect delay may be particularly troubling within a large memory array such as a cache. Additionally, semiconductor fabrication technology improvements have enabled the inclusion of increasing numbers of functional units (e.g. units configured to execute at least a subset of the instructions within the instruction set employed by the microprocessor). While the added functional units increase the number of instructions which may be executed during a given clock cycle, the added functional units accordingly increase the bandwidth demands upon the data cache. Still further, the interconnect delay between the data cache and the functional units increases with the addition of more functional units (both in terms of length of the interconnect and in the capacitive load thereon).

Instructions awaiting memory operands from the data cache are stalled throughout the cache latency period. Generally, an instruction operates upon operands specified by the instruction. An operand may be stored in a register (register operand) or a memory location (memory operand). Memory operands are specified via a corresponding address, and a memory operation is performed to retrieve or store the memory operand. Overall instruction throughput may be reduced due to the increasing cache latency experienced by these memory operations. The x86 microprocessor architecture is particularly susceptible to cache latency increase, since relatively few registers are available. Accordingly, many operands in x86 instruction code sequences are memory operands. Other microprocessor architectures are deleteriously affected as well.

SUMMARY OF THE INVENTION

The problems outlined above are in large part solved by a microprocessor in accordance with the present invention. The microprocessor employs a local cache for each functional unit, located physically close to that functional unit. The local caches are relatively small as compared to a central cache optionally included in the microprocessor as well. Because the local caches are small, internal interconnection delays within the local caches may be less than those experienced by the central cache. Additionally, the physical proximity of the local cache to the functional unit which accesses the local cache reduces the interconnect delay between the local cache and the functional unit. Advantageously, a functional unit which fetches a memory operand from the local cache connected thereto may experience a decreased cache latency. If the memory operand hits in a remote cache (either a different local cache or the central cache), a longer cache latency is experienced. Additionally, the cache line containing the memory operand is transferred to the local cache experiencing the miss. In this manner, subsequent accesses to the cache line containing the memory operand will hit in the local cache.

In addition to decreasing cache latency, the local caches increase the amount of cache bandwidth available to the microprocessor. Essentially, each local cache is a dedicated cache port for the corresponding functional unit. Each port independently and concurrently services a different cache access. Building a conventional cache having a port for each functional unit becomes unwieldy as the number of functional units increases.

According to one embodiment including multiple symmetrical functional units, the local caches coupled to the symmetrical functional units are restricted to storing different cache lines from each other. For example, a number of bits of the tag address may be used to select which of the local caches is to store the corresponding cache line. In this manner, cache lines are not repeatedly swapped between the caches when instructions executing within the different functional units have memory operands within the same cache line. A data prediction scheme for predicting the functional unit to which a given instruction should be dispatched may be implemented, wherein the prediction is formed based upon the cache line storing the memory operand during a previous execution of the given instruction. When instructions are routed according to the data prediction scheme, the memory operands corresponding to instructions may be more likely to hit in the local cache attached to the functional unit executing the instructions.

Broadly speaking, the present invention contemplates a microprocessor comprising first and second functional units and first and second local caches. The first and second functional units are both configured to execute instructions. The first functional unit is coupled to the first local cache, and is configured to access the first local cache in order to retrieve a first memory operand corresponding to a first instruction. The second functional unit is coupled to the second local cache, and is configured to access the second local cache in order to retrieve a second memory operand corresponding to a second instruction.

The present invention further contemplates a method for accessing memory operands in a microprocessor. A first address corresponding to a first memory operand of a first instruction is generated in a first functional unit of the microprocessor. The second address corresponding to a second memory operand of a second instruction is generated in a second functional unit. A first local cache coupled to the first functional unit is accessed in order to locate the first memory operand. The second local cache coupled to the second functional unit is accessed in order to locate the second memory operand.

The present invention still further contemplates a method for dispatching an instruction to one of a first functional unit configured to execute the instruction and a second functional unit configured to execute the instruction. The first functional unit is coupled to a first local cache configured to store memory operands and the second functional unit is coupled to a second local cache configured to store memory operands. One of the first local cache and the second local cache is predicted to be storing a first memory operand corresponding to the instruction. The instruction is dispatched to the first functional unit if the first local cache is predicted. The instruction is dispatched to the second functional unit if the second local cache is predicted.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
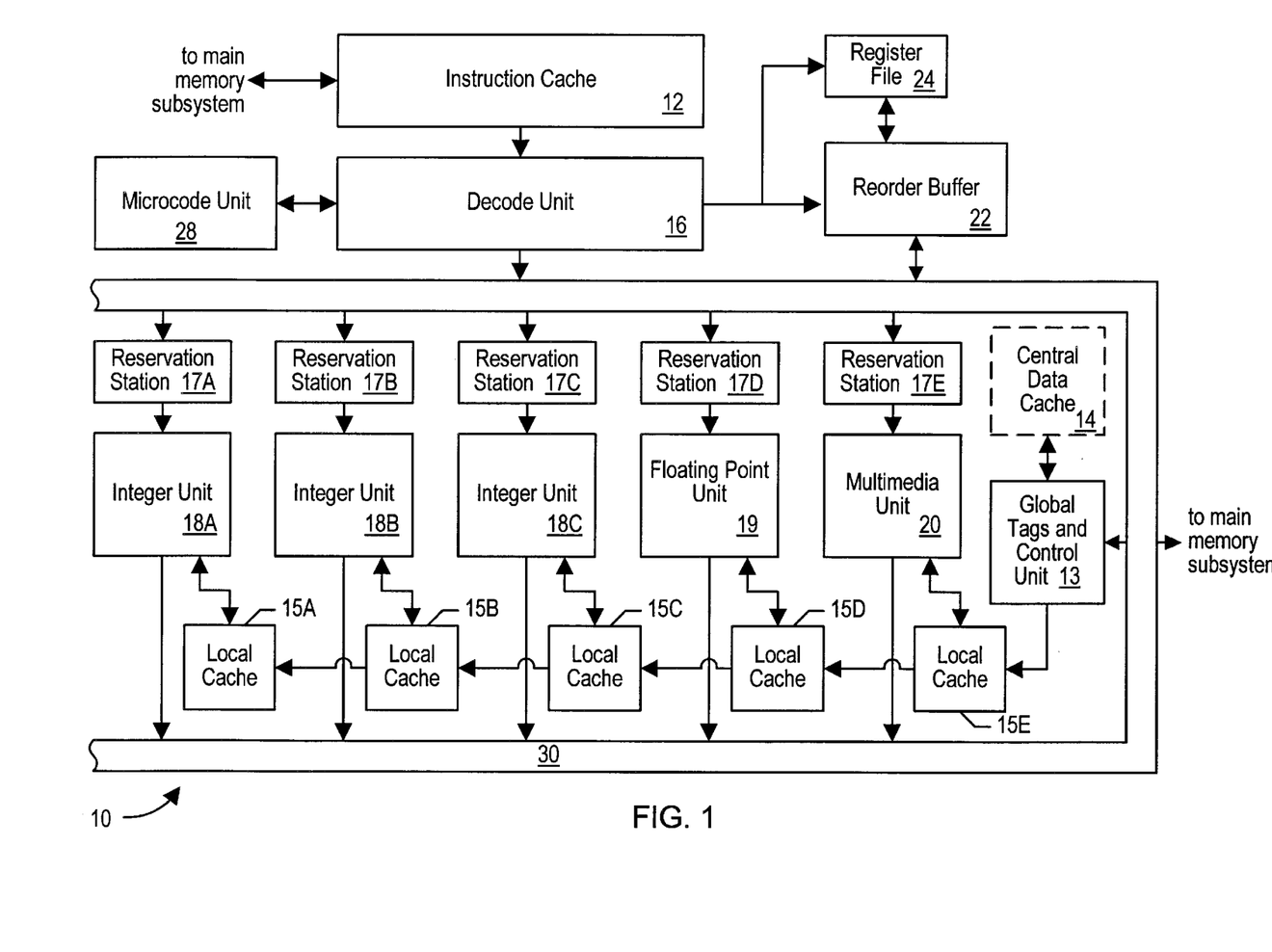
FIG. 1 is a block diagram of one embodiment of a microprocessor.

Turning now to FIG. 1, a block diagram of one embodiment of a microprocessor 10 is shown. Microprocessor 10 includes an instruction cache 12, a global tags and control unit 13, a central data cache 14, a plurality of local caches 15A–15E, a decode unit 16, a plurality of reservation stations including reservation stations 17A–17E, a plurality of integer units 18A–18C, a floating point unit 19, a multimedia unit 20, a reorder buffer 22, a register file 24, and a microcode unit 28. Elements referred to herein with a particular reference number followed by a letter will be collectively referred to by the reference number alone. For example, the plurality of integer units will be collectively referred to herein as integer units 18. Integer units 18 may include more integer units than integer units 18A–18C shown in FIG. 1. Additionally, an embodiment of microprocessor 10 may include one integer unit 18. Furthermore, other embodiments of microprocessor 10 may include multiple floating point units 19 and multiple multimedia units 20. Integer units 18, floating unit 19, and multimedia unit 20 will collectively be referred to herein as "functional units".

As shown in FIG. 1, instruction cache 12 is coupled to a main memory subsystem (not shown) and to decode unit 16, which is further coupled to reservation stations 17, reorder buffer 22, register file 24, and microcode unit 28. Reorder buffer 22, integer units 18, floating point unit 19, and multimedia unit 20 are each coupled to a result bus 30 for forwarding of execution results. Furthermore, each integer unit 18A–18C, floating point unit 19, and multimedia unit 20 is coupled to a respective local cache 15A–15E. Each reservation station 17A–17E is coupled to a respective integer unit 18A–18C, floating point unit 19, or multimedia unit 20. Additionally, local caches 15 are coupled to global tags and control unit 13, which is further coupled to central data cache 14 and to the main memory subsystem. Each reservation station 17 is coupled to receive operand information from reorder buffer 22.

Generally speaking, the functional units are configured to access the local cache 15A–15E coupled thereto in order to retrieve memory operands for instructions being executed within that functional unit. Local caches 15 are relatively small as compared to central data cache 14, thereby providing faster access time due to the smaller physical size and reduced capacitance within the storage arrays comprising the local caches. For example, local caches 15 may include 64 or 128 cache lines each (according to one embodiment). Other embodiments may include more or fewer entries. Additionally, since local caches 15 can be physically placed closer to the accessing functional unit, delays induced due to the interconnect between the cache and the accessing functional unit can be minimized. Advantageously, access to a memory operand which is stored in the local cache attached to the functional unit performing the access may be performed more quickly (e.g. in fewer clock cycles) than if the access were performed to a single larger cache (such as central data cache 14).

In parallel with conveying the address corresponding to a memory operand to the corresponding local cache 15A–15E, the functional units convey the address to global tags and control unit 13. Global tags and control unit 13 stores the tags for the cache lines stored in each of local caches 15A–15E. Additionally, each of local caches 15A–15E stores tags for the cache lines stored in that local cache 15A–15E. If a hit is detected for a requested memory operand in the local cache 15A–15E connected to the requesting functional unit, then the data is provided rapidly to the requesting functional unit. The functional unit uses the data provided by the local cache 15A–15E if a hit is detected. If a miss is detected in the local cache 15A–15E connected to the requesting functional unit, but global tags and control unit 13 detects that the memory operand hits in a different local cache 15A–15E or central data cache 14 (a "remote cache"), then the memory operand is forwarded from the different local cache 15A–15E or central data cache 14 to the requesting functional unit. Additionally, the cache line containing the memory operand is transferred into the local cache 15A–15E and is invalidated in the cache which provides the cache line. Finally, if global tags and control unit 13 detects a miss in all caches, global tags and control unit 13 initiates a transfer of the accessed cache line from the main memory subsystem. The cache line is stored into the local cache 15A–15E corresponding to the requesting functional unit.

Integer, floating point, and multimedia data are typically stored in different areas of main memory, as opposed to being intermixed. For such arrangements of data, local caches 15 may perform particularly well. Cache lines containing integer data are generally stored in local caches 15A, 15B, and 15C (as opposed to local caches 15D and 15E). Similarly, cache lines containing floating point data are generally stored in local cache 15D (as opposed to local caches 15A–15C and 15E); and cache lines containing multimedia data are generally stored in local cache 15E (as opposed to local caches 15A–15D). Since cache lines typically store one type of data in the abovementioned arrangement, the transfer of cache lines between local caches 15 attached to differing functional units are rare.

On the other hand, in the absence of any additional control mechanisms, transfers of cache lines between local caches 15 which are attached to similar functional units may be more common. For the embodiment of FIG. 1, for example, transfers of cache lines between local caches 15A, 15B, and 15C may occur often due to the connection of these local caches to integer units 18 (especially if integer units 18 are symmetrical). In order to further improve the hit rate of the local caches 15A–15C, global tags and control unit 13 may store a cache line into one of local caches 15A–15C according to the encoding of the low order bits of the tag portion of the address of the cache line. If a functional unit attached to another local cache 15A–15C accesses a memory operand stored in a particular local cache 15A–15C, the memory operand is forwarded to the functional unit but the cache line is not transferred. Microprocessor 10 may employ a data prediction algorithm to select an integer unit 18 to dispatch a given instruction to. The data prediction algorithm may be based upon the addresses generated when the given instruction was previously executed. If a memory operand used by a given instruction during a current execution is within the same cache line as a memory operand used during a previous execution, then the likelihood of achieving a local cache hit may be increased dispatching the given instruction to the selected integer unit 18.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by the functional units to execute the instruction.

Decode unit 16 also detects the register operands used by the instruction and requests these operands from reorder buffer 22 and register file 24. In one embodiment, integer units 18 are symmetrical execution units. Symmetrical execution units are each configured to execute a particular subset of the instruction set employed by microprocessor 10. The subsets of the instruction set executed by each of the symmetrical execution units are the same. In another embodiment, integer units 18 are asymmetrical execution units configured to execute dissimilar instruction subsets. For example, integer units 18 may include one or more branch units for executing branch instructions and one or more arithmetic/logic units for executing arithmetic and logical instructions.

Generally speaking, integer units 18 are configured to execute integer instructions. Similarly, floating point unit 19 is configured to execute floating point instructions and multimedia unit 20 is configured to execute multimedia instructions. An integer instruction is an instruction which operates upon integer operands (i.e. whole numbers which do not have a fractional portion). The bits of an integer operand are interpreted as a whole number (i.e. the decimal point for the operand is assumed to be to the right of all the bits in the integer operand). A floating point instruction is an instruction which operates upon floating point operands. A floating point operand is represented by a significand, an exponent, and a sign bit. The corresponding numerical value is the mantissa corresponding to the significand multiplied by the base (e.g. base 2 in the IEEE 754 specification) raised to the exponent power. The numerical value is either positive or negative based upon the sign bit. Finally, multimedia instructions are instructions designed for efficient operation upon audio and video data. Such instructions often are single instruction, multiple data (SIMD) type instructions. For example, in embodiments of microprocessor 10 employing the x86 microprocessor architecture, the multimedia instructions are the multimedia extension (MMX) instructions. Decode unit 16 dispatches an instruction to a reservation station 17 which is coupled to a functional unit which is configured to execute that instruction.

Microcode unit 28 is included for handling instructions for which the architecturally defined operation is more complex than the hardware employed within the functional units may handle. Microcode unit 28 parses the complex instruction into multiple instructions which the functional units are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Reservation stations 17 are configured to store instructions whose operands have not yet been provided. An instruction is selected from those stored in a reservation station 17A–17E for execution if: (1) the operands of the instruction have been provided, and (2) the instructions within the reservation station 17A–17E which are prior to the instruction being selected in program order have not yet received operands. It is noted that a centralized reservation station may be included instead of separate reservations stations. The centralized reservation station is coupled between decode unit 16 and the functional units. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17E which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When integer units 18, floating point unit 19, or multimedia unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, integer units 18, floating point unit 19, multimedia unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Central data cache 14 is a high speed cache memory configured to store data to be operated upon by microprocessor 10. It is noted that central data cache 14 may be configured into a set-associative or direct-mapped configuration. For example, central data cache 14 may comprise a 32 kilobyte, eight way set associative cache. Additionally, central data cache 14 is an optional component of microprocessor 10 (as indicated by the dashed block 14). Since local caches 15 are relatively small, central data cache 14 may improve the overall cache hit rate within microprocessor 10. The larger size of central data cache 14 (as well as its associativity, in associative embodiments) make central data cache 14 less susceptible to cache thrashing and cache pollution. Central data cache 14 allocates and deallocates storage for data in cache lines in response to communications from global tags and control unit 13. A cache line is a block of contiguous bytes (as stored in main memory). The byte within the cache line which has the lowest numerical address is stored at an address which is aligned to a cache line boundary. Each cache line is identified by an associated cache tag. The cache tag comprises a portion of the address identifying the bytes within the cache line, as well as a state of the cache line (e.g. whether or not the cache line is valid in the cache). Generally, an address is logically divided into three parts for cache purposes: an offset which locates a particular byte within a cache line, an index which selects a row of the cache, and a tag portion which is included in the cache tag. The row of the cache selected by the index portion of the address includes storage for one or more cache lines. The tag portion of the address is compared to the tag stored for each cache line in the indexed row. If the tag portion of the address and the tag match, a hit is detected and the corresponding bytes are provided (for a load memory operation) or updated (for a store memory operation). If the tag portion of the address does not match any tags in the row, then a miss is detected and the corresponding bytes are fetched from the main memory subsystem.

Figure 2:
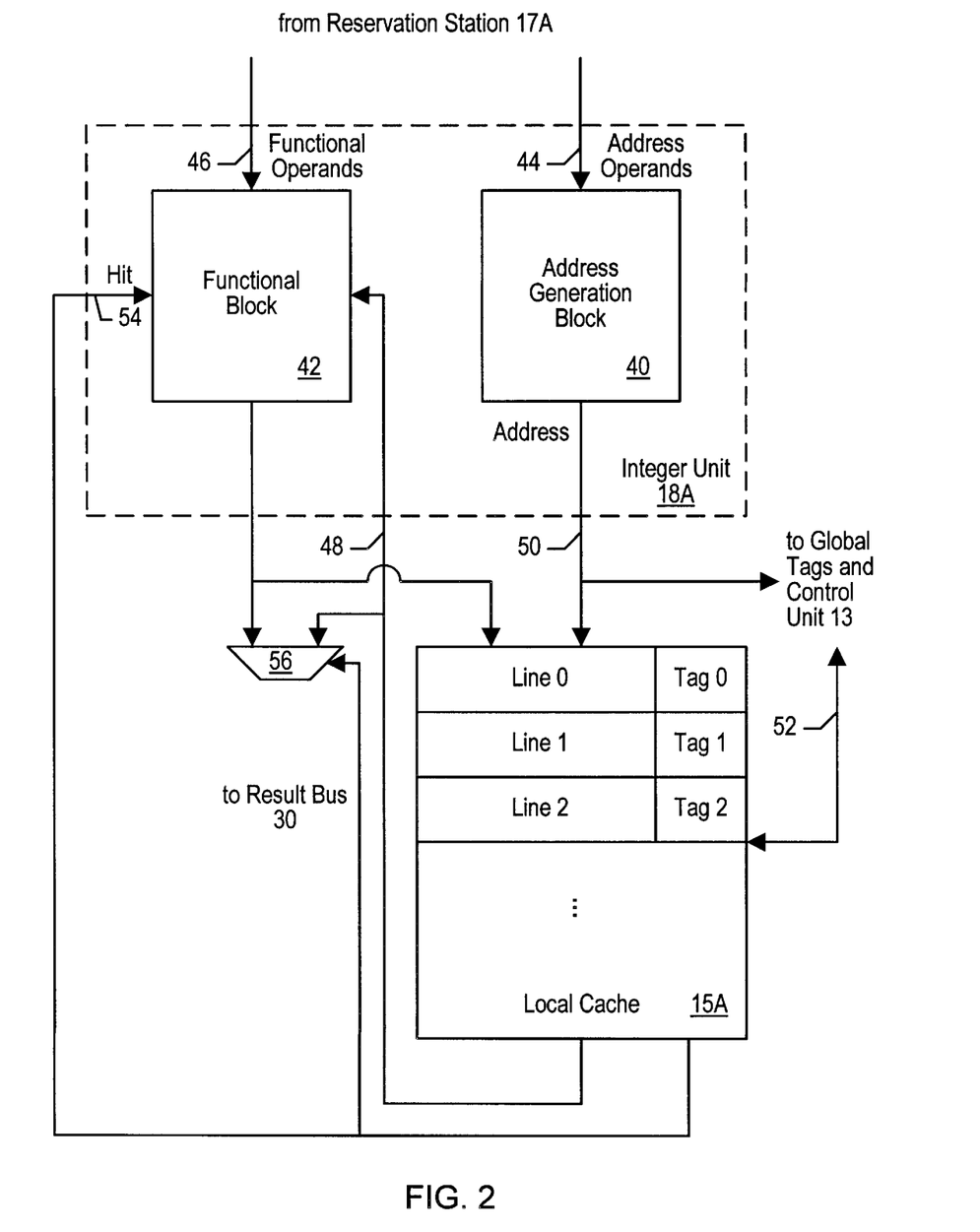
FIG. 2 is a block diagram of one embodiment of an integer unit and one embodiment of a local cache shown in FIG. 1.

Turning next to FIG. 2, a block diagram illustrating one embodiment of integer unit 18A coupled to one embodiment of local cache 15A is shown. Integer units 18B–18C, floating point unit 19, multimedia unit 20, and the corresponding local caches 15B–15E may be configured similarly. As shown in FIG. 2, integer unit 18A includes an address generation block 40 and a functional block 42. Address generation block 40 is coupled to receive address operands upon an address operands bus 44, and functional block 42 is coupled to receive functional operands upon a functional operands bus 46. Additionally, functional block 42 may receive a memory operand upon a memory operand bus 48 from local cache 15A. Local cache 15A provides the memory operand in response to an address upon an address bus 50 from address generation block 40. Additionally, address bus 50 is coupled to global tags and control unit 13, which is further coupled to a cache line transfer bus 52. Cache line transfer bus 52 is coupled to local cache 15A. Furthermore, functional block 42 is coupled to provide a result to a multiplexor 56, which is coupled to result buses 30. Additionally, functional block 42 is coupled to a hit line 54 from local cache 15A. Multiplexor 56 selects between memory operand bus 48 and the output of functional block 42 for providing results upon result bus 30 in response to hit line 54. If hit line 54 is asserted, then memory operands bus 48 is selected. If hit line 54 is deasserted, then the output of functional block 42 is selected.

Generally, an instruction has a plurality of operands. Some of the operands are used to form the address of a memory operand when the instruction specifies a memory operand. These operands are referred to as address operands. Address operands may be any combination of register operands or displacement values coded into the instruction. Additionally, other operands are operated upon by the functional unit to produce a result of the instruction. These operands are referred to as functional operands. The memory operand is a functional operand, along with register operands (other than address operands) and immediate values coded into the instruction.

Upon selecting an integer instruction having a memory operand for execution, reservation station 17A conveys the address operands of the integer instruction upon address operands bus 44 to address generation block 40. Address generation block 40 generates the address of the memory operand from the address operands, and conveys the address to local cache 15A and global tags and control unit 13.

According to the embodiment shown in FIG. 2, local cache 15A is direct-mapped. In other words, one cache line is selected in response to the index portion of the address provided upon address bus 50. Local cache 15A performs a tag comparison between the selected tag and the address provided upon address bus 50 in order to generate the hit signal upon hit line 54 (i.e. asserts the hit signal for a hit and deasserts the hit signal for a miss). Furthermore, using the offset portion of the address, local cache 15A locates the portion of the indexed cache line containing the memory operand and conveys the memory operand upon memory operand bus 48. The remaining functional operands are provided by reservation station 17A upon functional operands bus 46 at the time that the memory operand is provided upon memory operand bus 48. Additionally, the decoded integer instruction is provided. Functional block 42 performs the architected operation corresponding to the integer instruction upon the operands specified for the instruction. Functional block 42 conveys the resulting value upon result bus 30. Additionally, the resulting value may be stored in local cache 15A if the memory operand of the instruction is the destination of the instruction.

Functional block 42 receives the hit signal upon hit line 54 during execution of an instruction which uses a memory operand. If local cache 15A detects a hit for the memory operand, the hit signal is asserted. Functional block 42 completes execution of the instruction normally. On the other hand, the memory operand may miss local cache 15A. If a miss is detected, local cache 15A deasserts the hit signal. Upon receiving a deasserted hit signal, functional block 42 cancels forwarding of the calculated result. Since the value provided via memory operand bus 48 is incorrect, the result calculated by functional block 42 using the incorrect memory operand is incorrect as well.

Upon detecting a miss in local cache 15A and a hit in another local cache 15B–15E or central data cache 14, global tags and control unit 13 transfers the cache line and corresponding tag to local cache 15A upon cache line transfer bus 52. Additionally, global tags and control unit 13 may transfer a cache line from local cache 15A to another cache in response to a miss in the other cache which hits in local cache 15A. Cache line transfer bus 52 may be used for this purpose as well. Generally, the row of local cache 15A affected by the transfer is transmitted to local cache 15A upon cache transfer bus 52, and the corresponding cache line and tag is transmitted to or from local cache 15A depending upon the direction of the transfer.

Reservation station 17A receives hit line 54 as well, and retains the instruction being executed so that the instruction may be re-executed if a miss is indicated. According to one embodiment, global tags and control unit 13 forwards the memory operand from the cache in which the hit is detected to reservation station 17A. Subsequently, the instruction may be executed by functional block 42. Alternatively, the instruction may be re-executed by generating the address in address generation block 40, accessing local cache 15A, and forwarding the memory operand to functional block 42. Since the cache line containing the memory operand is transferred to local cache 15A upon detecting the miss, the memory operand may hit in local cache 15A upon re-executing the instruction. As yet another alternative, local caches 15A–15E and central data cache 14 may be connected to result bus 30 to forward operands to reservation stations 17.

According to one embodiment, address generation block 40 generates and address and local cache 15A forwards the corresponding memory operand during a first clock cycle, and functional block 42 performs the corresponding instruction operation during a second clock cycle succeeding the first clock cycle. However, more or fewer clock cycles may be employed according to various embodiments.

It is noted that microprocessor 10 may employ address translation between the address generated by address generation block 40 and the addresses which identify bytes within main memory. Global tags and control unit 13 may perform the translation. Alternatively, local caches 15 and central data cache 14 may be virtually addressed (or linearly addressed, in embodiments of microprocessor 10 employing the x86 microprocessor architecture). Global tags and control unit 13 may translate addresses when a main memory access is performed. It is further noted that functional block 42 may be configured to perform both address generation and instruction operations. Address generation block 40 may be eliminated in such embodiments. It is still further noted that, in embodiments employing the x86 microprocessor architecture, a segment base from a segment register selected according to the instruction being executed may be added by address generation block 40 to the address operands.

It is noted that, although the above discussion has indicated that local caches 15A–15E employ a cache line size equal to that of central data cache 14, local caches 15A–15E may employ a different cache line size. For example, local caches 15A–15E may employ a smaller cache line size. In this manner, less bussing may be required between the local caches and central data cache 14.

Figure 3:
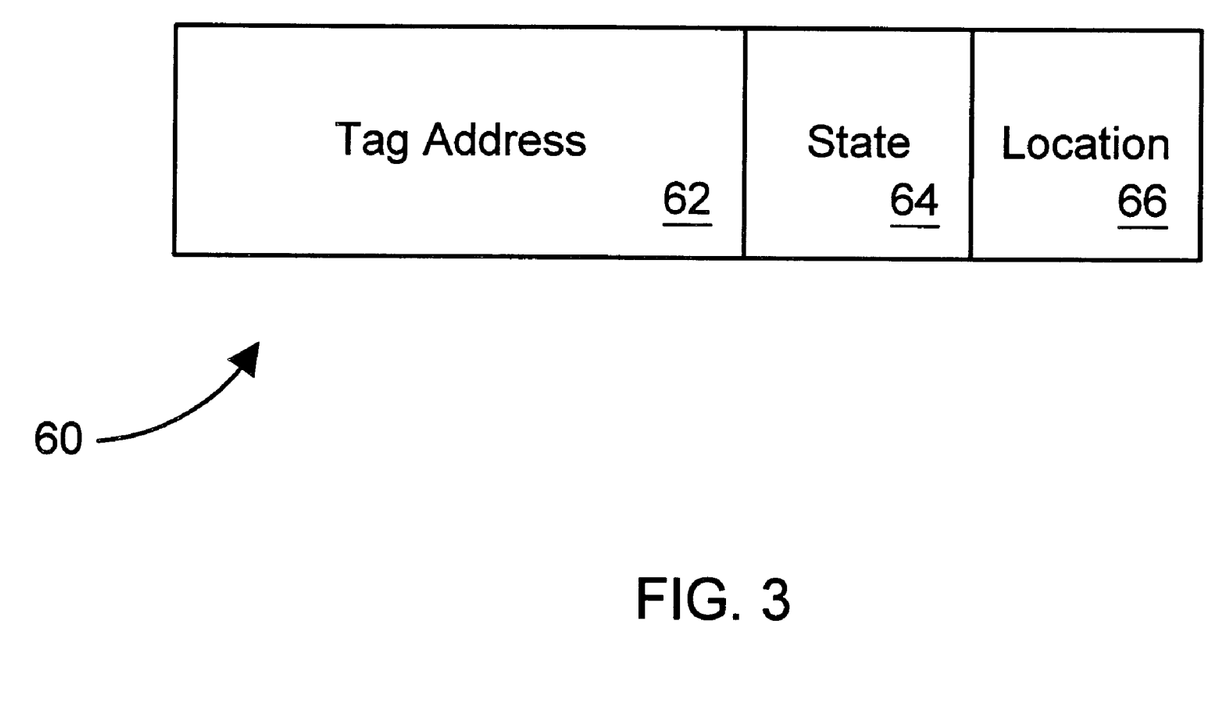
FIG. 3 is a diagram of one embodiment of a tag stored by a global tags and control unit shown in FIG. 1.

Turning now to FIG. 3, an exemplary cache tag 60 employed by one embodiment of global tags and control unit 13 is shown. Cache tag 60 includes a tag address field 62, a state field 64, and a location field 66. A cache tag is stored by global tags and control unit 13 for each cache line stored by a local cache 15 or central data cache 14. Tag address field 62 stores the tag portion of the address identifying the cache line.

State field 64 stores the state of the cache line. The state field 64 indicates at least the validity or the invalidity of the cache line. According to one embodiment, the state field may encode a MESI cache protocol. The MESI cache protocol includes four states: Modified, Exclusive, Shared, and Invalid (hence the acronym MESI). The modified state indicates that the cache line has been updated with respect to the corresponding set of bytes stored in main memory. The exclusive state indicates that the cache line has not been updated, but that the copy stored in the cache is the only copy of the cache line other than the one store in main memory. The shared state similarly indicates that the cache line has not been updated. However, the shared state indicates that at least one other copy (not including the copy stored in main memory) may exist within the computer system including the microprocessor. Finally, the invalid state indicates that the cache line is invalid (i.e. the corresponding storage location is not storing valid bytes).

Location field 66 indicates the cache which is storing the cache line identified by tag address field 62. Location field 66 may be a one-hot encoding in which each bit of location field 66 is assigned to one of local caches 15A–15E or central data cache 14. If the bit is set, the cache line is stored in the corresponding cache. If the bit is clear, the cache line is not stored in the corresponding cache. Alternatively, location field 66 may comprise an encoded value with a different encoding corresponding to each cache.

Figure 4:
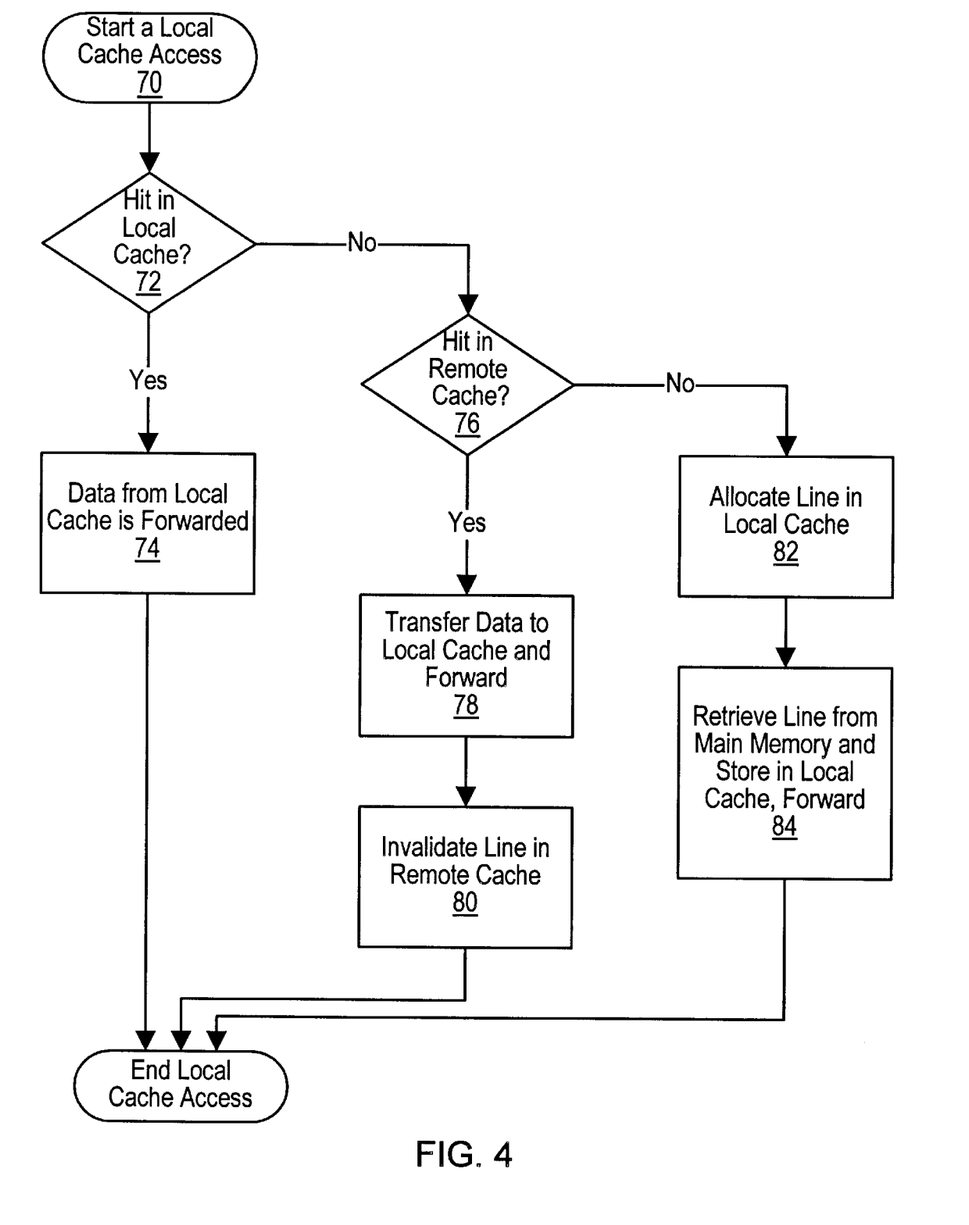
FIG. 4 is a flow chart illustrating the detection of cache hits and misses according to one embodiment of the global tags and control unit shown in FIG. 1.

Turning now to FIG. 4, a flow chart illustrating the detection of cache hits and misses in global tags and control unit 13 for a particular cache access is shown. A functional unit begins a cache access for a memory operand in the local cache 15A–15E coupled to that functional unit (block 70). The functional unit also convoys the address of the memory operand to global tags and control unit 13. Global tags and control unit 13 searches the cache tags stored therein for the cache tag corresponding to the address. If the cache tag indicates a hit in the local cache (decision block 72), then the memory operand forwarded by the local cache is the correct memory operand (block 74). The memory operand is thereby provided.

Alternatively, global tags and control unit 13 may determine that the memory operand misses in the local cache connected to the functional unit performing the cache access. When a local cache miss is determined, global tags and control unit 13 further determines if the memory operand hits in a remote cache (decision block 76). A remote cache is either central data cache 14 or a local cache 15A–15E connected to a functional unit other than the functional unit perform the cache access. If a hit in a remote cache is detected, the cache line is transferred to the local cache 15 connected to the functional unit performing the cache access (block 78). Additionally, the cache line is invalidated in the remote cache in which the hit is detected (block 80). In this manner, at most one cache within microprocessor 10 stores a given cache line during any given clock cycle.

On the other hand, if the memory operand misses in both the local cache and the remote caches, then global tags and control unit 13 allocates a cache line in the local cache to store the cache line (block 82) and retrieves the cache line from main memory (block 84). The retrieved line is stored into the local cache upon receipt. The memory operand may be forwarded to the corresponding reservation station 17 upon receipt of the corresponding cache line. Alternatively, the memory operation corresponding to the instruction may be reinitiated by the corresponding reservation station 17.

It is noted that, when a cache line is transferred to a local cache (block 78) or a cache line is allocated for storing a cache miss (block 82), a cache line is discarded from the local cache. The discarded cache line may have been modified (i.e. when a memory operand is the destination operand of an instruction). If the discarded cache line is modified, the cache line may be written into central data cache 14 or stored back to main memory.

It is further noted that, in embodiments of global tags and control unit 13 which employ cache tag 60 as shown in FIG. 3, the decisions represented by decision blocks 72 and 76 are made in parallel by examining the location field 66 and by detecting the presence or absence of the corresponding tag address in tag address field 62.

As mentioned above, the cache lines accessed by floating point unit 19, multimedia unit 20, and any one of integer units 18 are not likely to conflict in many types of code organizations. The operand types are different in format, such that performing an integer operation upon a floating point or multimedia type operand is an atypical operation. Therefore, transfers between the local caches 15D, 15E, and any one of 15A–15C may be quite infrequent. Hit rates in the local caches 15 are not likely to be significantly affected by transfers between the caches.

On the other hand, cache line transfers between local caches 15A–15C may occur frequently. A similar problem may be experienced between local caches attached to multiple floating point units 19 or multiple multimedia units 20 in embodiments of microprocessor 10 including such multiple units. Instruction code often exhibits locality of reference, in which an access to a byte of a cache line indicates that other accesses to the cache line are likely. If instructions are simply dispatched to any available integer unit 18A–18C, then the cache lines being accessed may be repeatedly transferred between local caches 15A–15C.

As an alternative, local caches 15A–15C may be managed such that a given cache line is stored in a particular one of local caches 15A–15C. For example, a number of least significant bits of the tag address may be used to select which local cache 15A–15C is to store the given cache line. The least significant two bits may be used in the present embodiment. Tag addresses having the least significant bits equal to binary "00" may be stored in local cache 15A; tag addresses having the least significant bits equal to binary "01" may be stored in local cache 15B; and tag addresses having the least significant bits equal to binary "10" may be stored in local cache 15C. Tag addresses having least significant bits equal to binary "11" may be stored in any local cache 15A–15C, or may be assigned to one of the local caches 15A–15C.

In this manner, a proportionally larger set of data may be stored in local caches 15A–15C as a whole. Instead of thrashing certain cache lines between local caches 15A–15C, each cache is assigned to store a subset of the cache lines which may be stored in the local caches 15A–15C. A data prediction scheme may additionally be employed to increase the likelihood that an instruction which accesses a particular memory operand is routed to the integer unit 18A–18C which is connected to the local cache 15A–15C storing the cache line which includes the particular memory operand. If the instruction is successfully routed to the integer unit 18A–18C which experiences a local cache hit for the particular memory operand, then instruction execution efficiency may be increased.

Figure 5:
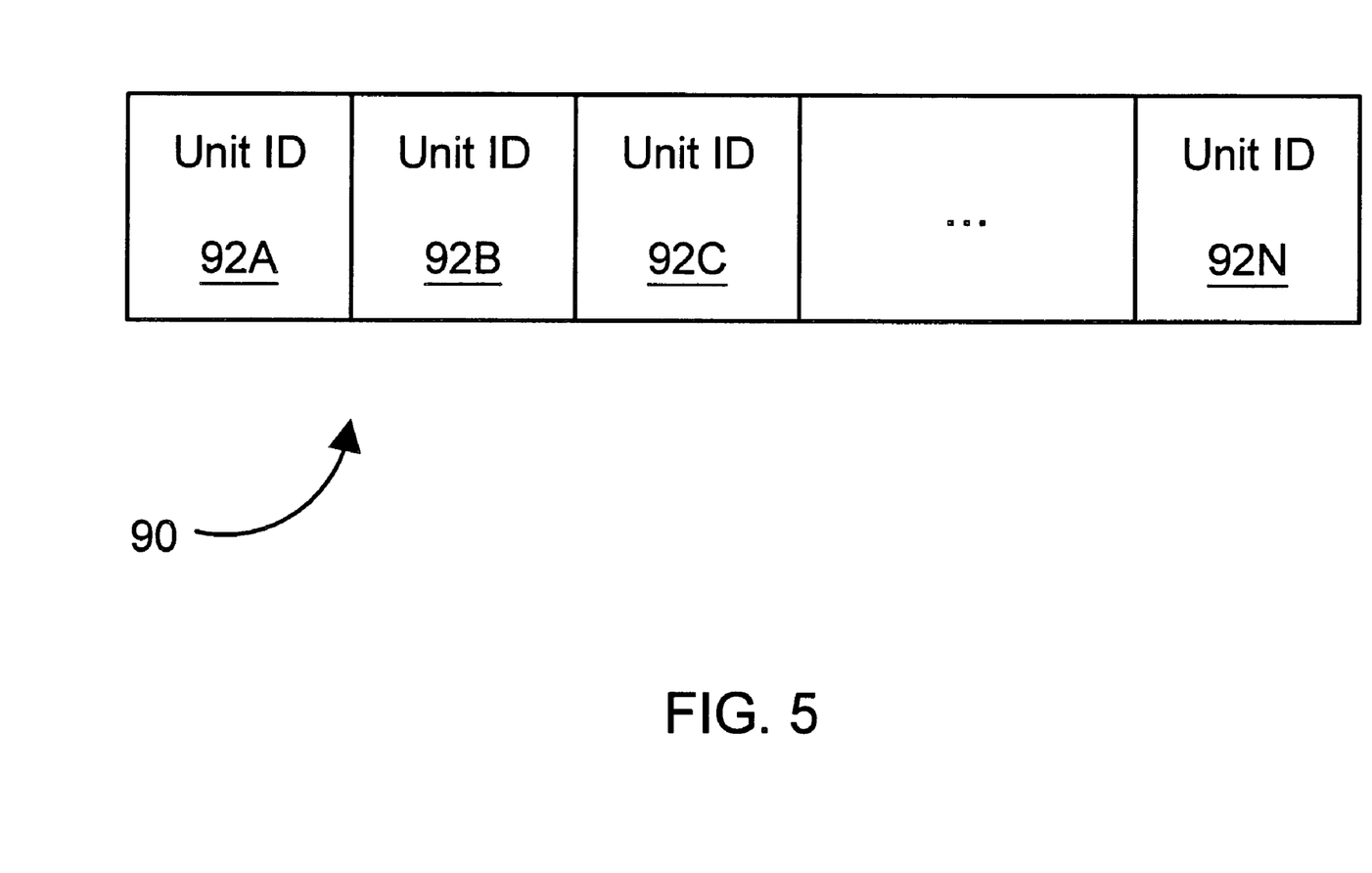
FIG. 5 is a diagram illustrating one embodiment of a prediction structure for instructions which access memory operands.

FIG. 5 illustrates data prediction information which may be stored with a cache line of instructions in instruction cache 12, according to one embodiment of microprocessor 10. Alternatively, data prediction information may be stored in a history table accessible by decode unit 16.

Prediction information 90 includes unit identification (ID) fields 92A–92N. Each unit ID field 92A–92N corresponds to an instruction within instruction cache 12. In an embodiment of microprocessor 10 employing the x86 microprocessor architecture, a unit ID field 92A–92N may be included for each byte within the cache line in order to provide a unit ID for each possible instruction within the cache line. Alternatively, a fixed number of unit ID fields 92A–92N may be stored for a cache line. If more than the fixed number of integer instructions reside within the cache line, then some of the integer instructions will not have a corresponding unit ID.

The unit ID identifies the functional unit to which an instruction is to be dispatched by decode unit 16. The unit ID is determined by the type of instruction (integer, floating point, or multimedia), and by the tag address generated for a memory operand of the instruction during a previous execution of the instruction. Decode unit 16 routes the instruction to a functional unit in response to the corresponding unit ID. If the instruction accesses a memory operand having a tag address with the same least significant bits as the previous execution, the instruction may experience a hit in the local cache 15 attached to the functional unit to which the instruction is dispatched.

Figure 6:
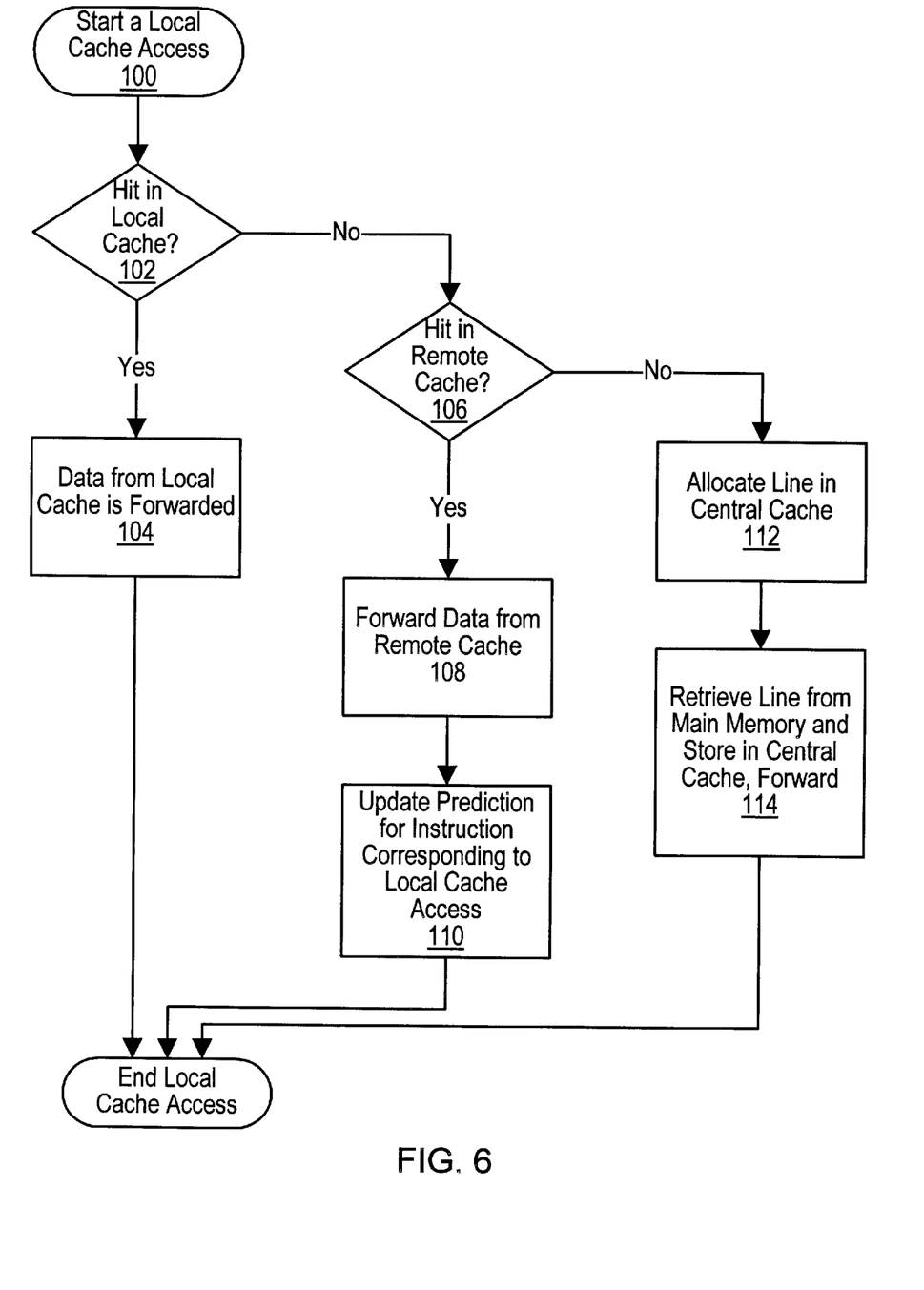
FIG. 6 is a flow chart illustrating the detection of cache hits and misses according to an embodiment of the global tags and control unit designed to operate in conjunction with the prediction structure shown in FIG. 5.

FIG. 6 is a flowchart illustrating operation of global tags and control unit 13 during a cache access for a memory operand. The flowchart of FIG. 6 is employed by an embodiment of global tags and control unit 13 which operates in accordance with data prediction and restricting the local cache 15A–15C in which a given cache line is stored.

When a cache access is initiated (block 100), global tags and control unit 13 determines if the requested memory operand hits in the local cache 15 attached to the functional unit performing the cache access (decision block 102). If a hit is detected, data from the local cache 15 is forwarded to the functional unit (block 104). Since the memory operand hit in the local cache, the data prediction for the instruction corresponding to the memory operand is correct. In other words, the corresponding unit ID directed decode unit 16 to dispatch the instruction to the functional unit which is attached to the local cache 15 storing the cache line which includes the memory operand of the instruction.

If the memory operand is not a hit in the local cache attached to the functional unit performing the cache access, global tags and control unit 13 determines if the requested memory operand hits in a remote cache (i.e. either central data cache 14 or a local cache 15A–15E connected to a functional unit other than the functional unit performing the cache access—block 106). If global tags and control unit 13 detects a hit in a remote cache, the requested memory operand is forwarded from the remote cache to the functional unit performing the cache access (block 108). However, if the remote cache is a local cache 15 connected to a functional unit of the same type (e.g. integer, floating point, or multimedia) as the functional unit executing the instruction, the cache line is not transferred to the local cache connected to the functional unit performing the cache access. Additionally, since the data prediction for the instruction for which the cache access is initiated is wrong, the data prediction is updated (block 110). In the exemplary data prediction mechanism, for example, the unit ID corresponding to the instruction is set to indicate the functional unit connected to the local cache 15 in which the hit is detected. The instruction may thereby be routed to the functional unit connected to the local cache 15 in which the hit is detected for a subsequent execution of the instruction. The subsequent execution may then experience a local cache hit for the memory operand.

If the remote cache in which the hit is detected is a local cache 15 connected to a different type of functional unit or is central data cache 14, the cache line may be transferred. The cache line is transferred to the local cache 15 attached to the functional unit performing the access, or to the local cache 15 attached to a functional unit of the same type, depending upon the tag address of the memory operand.

If the memory operand misses in the remote caches as well, global tags and control unit 13 allocates a cache line in central data cache 14 (block 112), and retrieves the cache line from main memory (block 114). Global tags and control unit 13 stores the cache line into the allocated storage within central data cache 14. Additionally, the memory operand is forwarded to the functional unit which initiated the access. Alternatively, global tags and control unit 13 may allocate a cache line within the local cache 15 in which the cache line should be stored (based upon the least significant bits of the tag address).

Figure 7:
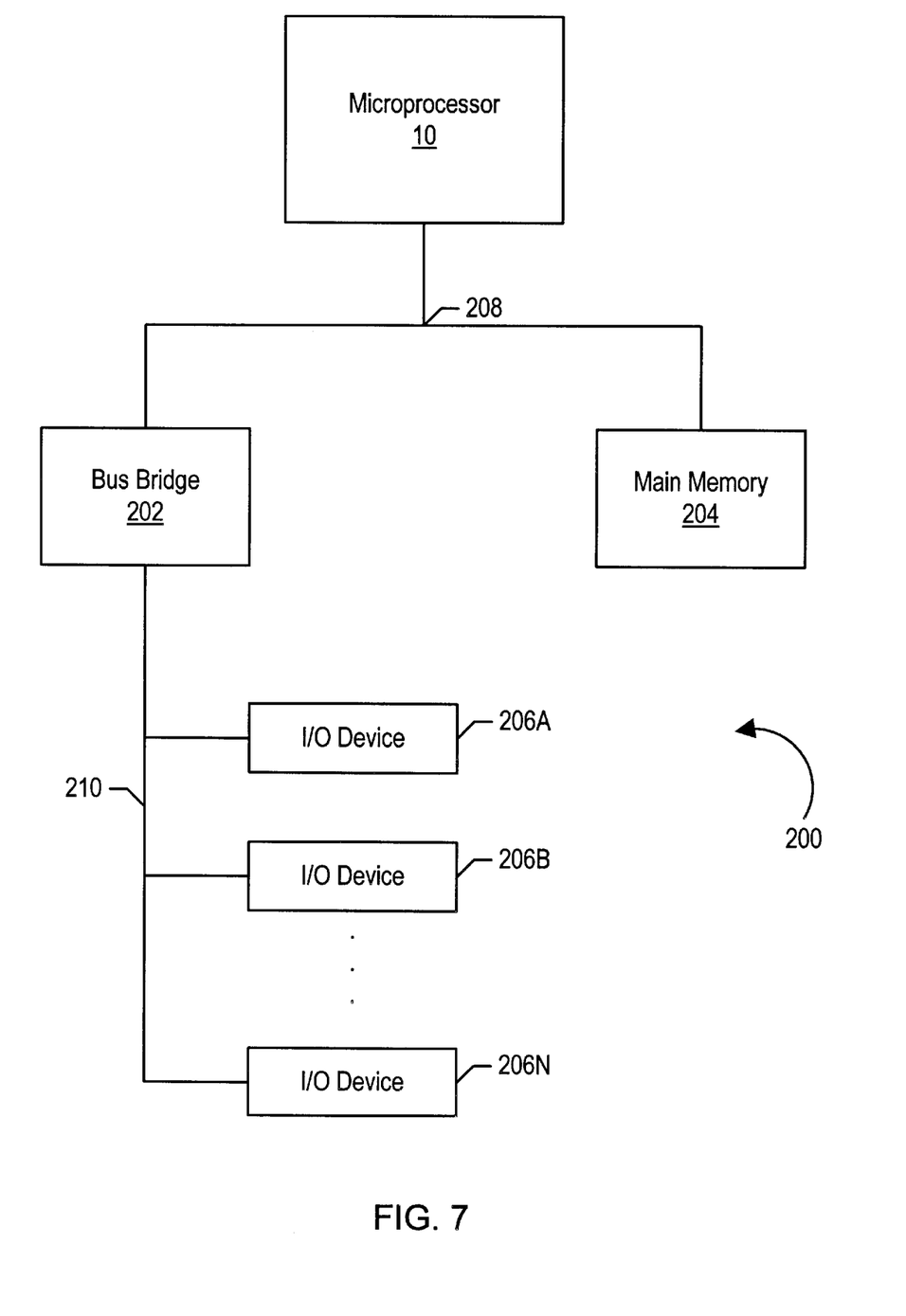
FIG. 7 is a block diagram of one embodiment of a computer system including the microprocessor shown in FIG. 1.

Turning now to FIG. 7, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 7 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10. It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a microprocessor has been described which employs local caches coupled to corresponding functional units. The local caches may be accessed more quickly than a single large cache, due to less delay in the smaller local caches and due to less interconnect delay between the local caches and the receiving functional unit. Advantageously, delays in accessing memory operands may be reduced. A corresponding increase in performance of the microprocessor may thereby be achieved.

Numerous variations and modifications will become apparent to those skilled in the art once the above disclosure is fully appreciated. It is intended that the following claims be interpreted to embrace all such variations and modifications.

What is claimed is:

1. A microprocessor comprising:

a first functional unit configured to execute instructions, wherein said first functional unit, responsive to a first plurality of address operands specified by a first instruction, is configured to generate a first memory address corresponding to a first memory operand of said first instruction;

a second functional unit configured to execute instructions, wherein said second functional unit, responsive to a second plurality of address operands specified by a second instruction, is configured to generate a second memory address corresponding to a second memory operand of said second instruction;

a first local cache coupled to said first functional unit, wherein said first functional unit is configured to access said first local cache using said first memory address in order to retrieve said first memory operand corresponding to said first instruction; and a second local cache coupled to said second functional unit, wherein said second functional unit is configured to access said second local cache using said second memory address in order to retrieve said second memory operand corresponding to said second instruction.

2. The microprocessor as recited in claim 1 further comprising a global tags and control unit coupled to said first local cache and said second local cache, wherein said global tags and control unit is configured to store a set of tags corresponding to cache lines stored in said first local cache and said second local cache, and wherein said global tags and control unit is further configured to determine, responsive to said set of tags, if said first memory operand hits in said first local cache and to determine, responsive to said set of tags, if said second memory operand hits in said second local cache.

3. The microprocessor as recited in claim 2 wherein said global tags and control unit is further configured to determine if said first memory operand hits in said second local cache if said first memory operand misses said first local cache.

4. The microprocessor as recited in claim 3 wherein, upon determining that said first memory operand hits in said second local cache, said global tags and control unit is further configured to transfer a first cache line containing said first operand from said second local cache to said first local cache.

5. The microprocessor as recited in claim 4 wherein said global tags and control unit is further configured to invalidate said first cache line in said second local cache upon transferring said first cache line to said first local cache.

6. The microprocessor as recited in claim 2 further comprising a data cache coupled to said global tags and control unit, said data cache having a substantially larger capacity than said first local cache and said second local cache.

7. The microprocessor as recited in claim 6 wherein said global tags and control unit is further configured to determine if said first memory operand hits in said data cache upon determining that said first memory operand misses said first local cache.

8. The microprocessor as recited in claim 7 wherein said global tags and control unit is further configured to transfer a first cache line containing said first memory operand to said first local cache if said first memory operand hits in said data cache.

9. The microprocessor as recited in claim 8 wherein said global tags and control unit is further configured to invalidate said first cache line from said data cache upon transferring said first cache line to said first local control unit.

10. The microprocessor as recited in claim 7 wherein said global tags and control unit is configured to initiate a fetch of said first memory operand from a main memory subsystem upon detecting a miss of said first memory operand in said data cache, and to transfer a first cache line including said first memory operand into said first local cache upon receiving said first cache line from said main memory subsystem.

11. The microprocessor as recited in claim 10 wherein said global tags and control unit is further configured to transfer a second cache line displaced from said first local cache by said first cache line into said data cache.

12. The microprocessor as recited in claim 1 wherein said first functional unit comprises an integer unit configured to execute integer instructions.

13. The microprocessor as recited in claim 1 wherein said first functional unit comprises a floating point unit configured to execute floating point instructions.

14. The microprocessor as recited in claim 1 wherein said first functional unit comprises a multimedia unit configured to execute multimedia instructions.

15. The microprocessor as recited in claim 1 wherein said first local cache is configured to store a first set of tags corresponding to cache lines stored within said first local cache, and wherein said first local cache is configured to determine if said first memory operand is stored therein by examining said first set of tags, and wherein said second local cache is configured to store a second set of tags corresponding to cache lines stored within said second local cache, and wherein said second local cache is configured to determine if said second memory operand is stored therein by examining said second set of tags.

16. The microprocessor as recited in claim 2 wherein said set of tags includes a location field for each cache line, said location field identifying which one of a plurality of caches including said first local cache and said second local cache is storing said cache line.

17. A method for accessing memory operands in a microprocessor, the method comprising:
generating a first address corresponding to a first memory operand of a first instruction in a first functional unit of said microprocessor responsive to a first plurality of address operands specified by said first instruction;
generating a second address corresponding to a second memory operand of a second instruction in a second functional unit responsive to a second plurality of address operands specified by said second instruction;
accessing a first local cache coupled to said first functional unit with said first address in order to locate said first memory operand; and
accessing a second local cache coupled to said second functional unit with said second address in order to locate said second memory operand.

18. A computer system comprising:
a microprocessor including:
a first functional unit configured to execute instructions, wherein said first functional unit, responsive to a first plurality of address operands specified by a first instruction, is configured to generate a first memory address corresponding to a first memory operand of said first instruction;
a second functional unit configured to execute instructions, wherein said second functional unit, responsive to a second plurality of address operands specified by a second instruction, is configured to generate a second memory address corresponding to a second memory operand of said second instruction;
a first local cache coupled to said first functional unit, wherein said first functional unit is configured to access said first local cache using said first memory address in order to retrieve said first memory operand corresponding to said first instruction; and
a second local cache coupled to said second functional unit, wherein said second functional unit is configured to access said second local cache using said second memory address in order to retrieve said second memory operand corresponding to said second instruction; and
an input/output (I/O) device coupled to said microprocessor and to another computer system, wherein said I/O device is configured to communicate between said computer system and said another computer system.

19. The computer system as recited in claim 18 wherein said I/O device comprises a modem.

20. A computer system comprising:
a microprocessor including:
a first functional unit configured to execute instructions;
a second functional unit configured to execute instructions;
a first local cache coupled to said first functional unit, wherein said first functional unit is configured to access said first local cache in order to retrieve a first memory operand corresponding to a first instruction;
a second local cache coupled to said second functional unit, wherein said second functional unit is configured to access said second local cache in order to retrieve a second memory operand corresponding to a second instruction; and
a global tags and control unit coupled to said first local cache and said second local cache, wherein said global tags and control unit is configured select one of said first local cache and said second local cache to store a particular cache line in response to a particular address corresponding to said particular cache line; and
an input/output (I/O) device coupled to said microprocessor and to another computer system, wherein said I/O device is configured to communicate between said computer system and said another computer system.

21. The computer system as recited in claim 20 wherein said I/O device comprises a modem.

22. A method for dispatching an instruction to one of a first functional unit configured to execute said instruction and a second functional unit configured to execute said instruction, said first functional unit being coupled to a first local cache configured to store memory operands and said second functional unit being coupled to a second local cache configured to store memory operands, the method comprising:
storing a particular memory operand into one of said first local cache and said second local cache responsive to one or more bits of a corresponding memory address of said particular memory operand;
predicting which one of said first local cache and said second local cache is storing a first memory operand corresponding to said instruction;
dispatching said instruction to said first functional unit if said first local cache is predicted; and
dispatching said instruction to said second functional unit if said second local cache is predicted.

23. The method as recited in claim 22 wherein said predicting comprises recording an indication of which one of said first local cache and said second local cache stores said first memory operand upon a previous execution of said instruction.

24. The method as recited in claim 23 further comprising updating said indication if said predicting is incorrect.

25. A microprocessor comprising:

a first functional unit configured to execute instructions;

a second functional unit configured to execute instructions;

a first local cache coupled to said first functional unit, wherein said first functional unit is configured to access said first local cache in order to retrieve a first memory operand corresponding to a first instruction;

a second local cache coupled to said second functional unit, wherein said second functional unit is configured to access said second local cache in order to retrieve a second memory operand corresponding to a second instruction; and a global tags and control unit coupled to said first local cache and said second local cache, wherein said global tags and control unit is configured select one of said first local cache and said second local cache to store a particular cache line in response to a particular address corresponding to said particular cache line.

26. The microprocessor as recited in claim 25 further comprising a decode unit configured to dispatch a first instruction to said first functional unit if a first address corresponding to a first memory operand accessed by said first instruction during a prior execution of said first instruction is an address which said global tags and control unit is configured to store into said first local cache.

27. The microprocessor as recited in claim 26 wherein said global tags and control unit, upon detecting a hit in said second local cache of a second memory operand accessed by said first instruction, is configured to forward said second memory operand to said first functional unit.

28. The microprocessor as recited in claim 27 wherein said decode unit, upon a subsequent dispatch of said first instruction, is configured to dispatch said first instruction to said second functional unit.

* * * * *